Dec. 9, 1941.     E. J. CULLIGAN     2,265,268
CONNECTOR
Filed Nov. 10, 1939
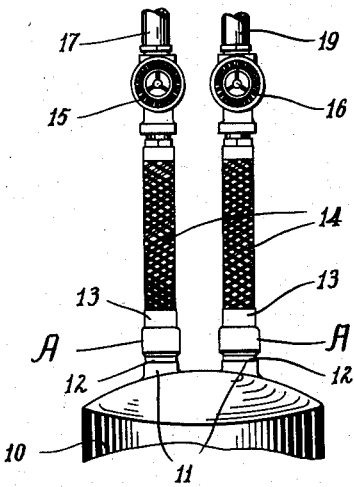
Fig. 1.
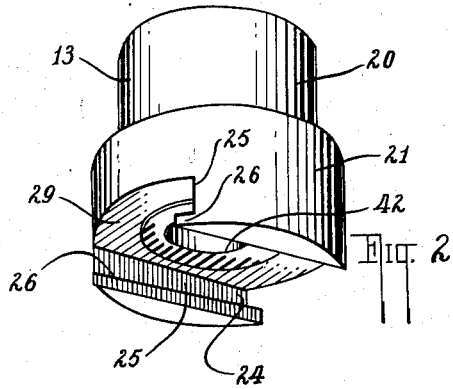
Fig. 2.
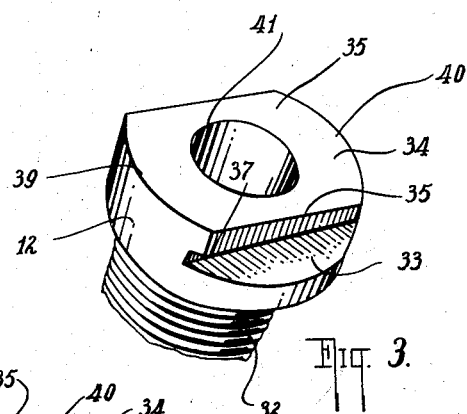
Fig. 3.
Fig. 5.
Fig. 6.
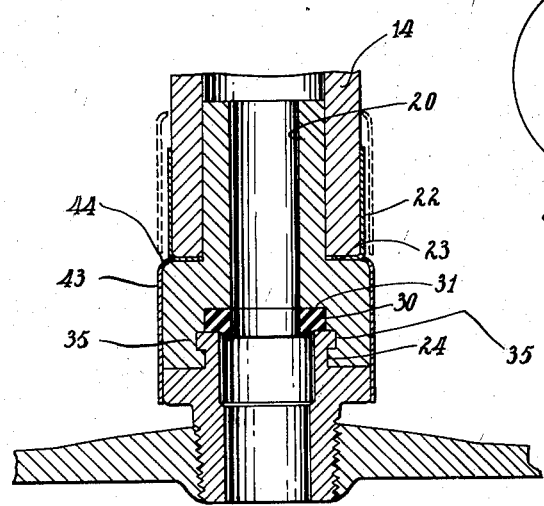
Fig. 4.
Inventor
Emmett J. Culligan
By Howard Fischer
Attorney Patented Dec. 9, 1941

2,265,268

UNITED STATES PATENT OFFICE 2,265,268

CONNECTOR

Emmett Joseph Culligan, La Grange, Ill., assignor to Culligan Zeolite Co., Northbrook, Ill., a copartnership Application November 10, 1939, Serial No. 303,805

1 Claim. (Cl. 285—60)

My invention relates to an improvement in couplings wherein it is desired to provide a quick acting coupling which may be locked in an extremely simple manner.

In the past, it has been common practice to lock pipes or tubes together by means of unions or other disconnectable joints. In some instances where quick action is desired, these couplings have been formed to slide or hook together in order to accomplish a quickly detachable coupling. It has been difficult, however, to so design such detachable couplings that they cannot accidentally become disengaged. Accordingly, the use of such couplings has been limited to certain uses where quick detachability is an extremely important factor.

In working upon water softener units in which cylinders of zeolite or other water softening material are provided to individual customers by a central service station, who rejuvenate the material when it becomes exhausted, it was extremely desirable to provide a quickly detachable coupling. It was also necessary, however, to provide a coupling which could not become accidentally disengaged. If the couplings were composed of two parts which were transversely slidably engageable, the couplings could be readily disengaged by bumping against the heavy tank of zeolite. Thus it was essential to provide a means of locking the parts of the coupling from disengagement.

It is the object of the present invention to provide a coupling formed of two main parts which are dovetailed together in such a way that they may be transversely moved into engagement. It is a further object of my invention to provide a ring which extends about the two parts of the coupling when the coupling is engaged to prevent the disengagement of these two parts.

It is a feature of my invention to provide a coupling comprised of two parts one of which extends upwardly from a tank, pipe, or suitable fitting, while the other depends downwardly from a cooperating pipe, tube, or hose. The coupling is so designed that the two main parts of the same will dovetail together into locked relationship. A ring encircles the pipe, tube or hose immediately above the coupling, and falls by gravity about the two parts of the coupling as soon as it is released. In other words, the locking ring must be manually held out of locking position as the coupling is engaged or disengaged. Thus the lock acts automatically to lock the parts of the coupling together as soon as the parts of the coupling have been brought into proper relationship.

It is a feature of my invention to provide a coupling having a dovetail connection which is wedge-shaped. One of the coupling members is provided with a transversely extending key which extends into a cooperating transverse slot on the other coupling member. Wedge-shaped locking flanges on one member cooperate with suitably shaped receiving grooves in the other member. When the two parts of the coupling are vertically in alignment, the wedge shape limits the sliding movement between the two parts and the openings through the parts of the couplings extend in vertical alignment.

It is a feature of my invention to provide a coupling having a resilient washer or gasket embedded thereinto which cooperates with the wedge shape of the dovetail connection to provide a seal between the two parts of the coupling. The wedge shape of the receiving groove and locking flanges draw the parts together as they approach alignment, and compress this gasket interposed between the parts. While the parts are in alignment, the locking sleeve extends about the two parts and prevents relative transverse movement between these parts, thus effectively sealing the connector in connected position.

These and other objects and novel features of my invention will be more fully and clearly set forth in the following specification and claim.

In the drawing forming a part of my specification:

Figure 1 is a front elevational view of a tank provided with a pair of connectors or couplings of my design.

Figure 2 is a perspective view of the upper or female portion of the connector.

Figure 3 is a perspective view of the lower or male portion of the connector.

Figure 4 is a cross-sectional view through the connector illustrating the same in position upon a tank.

Figure 5 is a top plan view of the lower or male portion of the connector.

Figure 6 is a bottom plan view of the upper or female portion of the connector.

The connectors A are designed for use in connection with a vertical pipe or tube. In the embodiment illustrated, a tank 10 is provided with nipples, couplings, or fittings 11 to which are secured the lower or male portions 12 of the connectors A. The upper or female portions of the connectors 13 are secured to a flexible pipe or tube 14 connected through the valves 15 and 16 to the inlet and outlet supply pipes 17 and 19.

The female portion of the connector illustrated in Figure 2 of the drawing comprises a cylindrical shank or sleeve 20 having an end or head portion 21 preferably of enlarged diameter. As illustrated in Figure 4 of the drawings, the shank or sleeve 20 extends within the flexible pipe or tube 14, the end of which is reinforced by a metallic sleeve 22 having an inturned end flange 23.

A transverse slot 24 is provided in the head portion 21 of the female portion 13 of the coupling. This slot 24 is formed as best illustrated in Figures 2 and 6 of the drawing and includes side walls 25 in parallel relationship. Opposed inwardly extending flanges 26 are provided adjacent the lower extremity of the coupling portion 13 in order to provide a means of locking the male portion of the connector in place. The groove 24 is not of equal depth throughout its length. As indicated in Figure 2 of the drawing, the surface 29 forming the base of the groove 24 and the base of the grooves 26 is inclined with respect to a plane across the lower extremity of the portion 13 of the coupling. A rubber gasket or washer 30 is provided in a recess 31 in the portion 13 of the connector as best illustrated in Figure 4 of the drawing. This gasket normally projects slightly from the lower surface 29 of the groove 24.

The lower or male portion 12 of the connector A is provided with a threaded shank 32 designed to fit into a suitable coupling pipe or fitting on the tank 10. The portion 12 of the coupling is provided with a disc-like base 33 having projecting from the upper surface thereof a projecting portion 34 designed to slidably engage in the female portion 13 of the coupling. This projecting portion 34 is provided with opposed grooves 35 on opposite sides of the same to accommodate the anchoring flanges 26 on the female portion 13. These grooves 35 taper slightly in width, being slightly narrower adjacent the forward end 37 of these grooves, so as to firmly engage the flanges 26 which are correspondingly tapered. The upper surface 35 of the projecting portion 34 is not parallel to the disc base 33, but is thicker along one edge 39 than along the opposite edge 40. The slant of the upper surface 35 corresponds with the slant of the lower surface 29 of the coupling 13. Thus the two parts 13 and 12 of the coupling dovetail together and the dovetail connection is wedge-shaped so that the two parts of the coupling wedge firmly together when the opening 41 in the male portion of the coupling aligns with the opening 42 in the female portion of the coupling, compressing the resilient gasket or washer 42.

A ring 43 encircles the enlarged head end 21 of the coupling 13 and the upper portion of the coupling member 12 which is of similar diameter. This ring is provided with an inturned flange 44 at its upper extremity which engages the upper edge of the enlarged head portion 21, to limit the downward movement of the ring. It will be noted that when this ring 43 is in the position illustrated in full lines in Figure 4 of the drawing, the two parts 12 and 13 of the coupling A will be held wedged or locked together, and no slidable movement between these parts may take place. In order to disengage the portions 12 and 13 of the coupling, it is necessary to raise the locking ring 43 into the dotted position indicated in Figure 4, whereupon one part may be moved slidably with respect to the other.

It will be seen that I have provided a simple type of slidable joint and have therefore provided a coupling which will be easy and quick to engage and disengage. The rubber gasket prevents leakage between the two main parts of the coupling, and the ring 43 prevents relative longitudinal movement between these two main coupling parts. Thus the ring 43 is of extreme importance in locking the coupler in its engaging position.

In accordance with the patent statutes, I have described the principles of construction and operation of my connector; and while I have endeavored to set forth the best embodiment thereof, I desire to have it understood that this is only illustrative of a means of carrying out my invention, and that obvious changes may be made within the scope of the following claim without departing from the spirit of my invention.

I claim:

In a connector, a pair of coupling members each having an elongated passage therethrough, a raised transverse wedge on one of said members, a substantially flat bearing surface thereon surrounding one of said passages, said surface lying on a plane substantially normal to the axis of said one passage, a tapered slot on the other of said members into which said wedge is transversely and slidably engageable, and a raised compressible gasket encircling the passage through said other member engageable with said flat surface on said one member.

EMMETT JOSEPH CULLIGAN.